(12) United States Patent
Castro Mercado et al.

(10) Patent No.: US 10,017,128 B2
(45) Date of Patent: Jul. 10, 2018

(54) TELESCOPIC LOAD FLOOR STRUCTURE

(71) Applicant: FORD GLOBAL TECHNOLOGIES, LLC, Dearborn, MI (US)

(72) Inventors: Sergio Irving Castro Mercado, Cuernavaca (MX); Emmanuel Garcia Ruiz, Santa Ursula Xitla (MX)

(73) Assignee: Ford Global Technologies LLC, Dearborn, MI (US)

( * ) Notice: Subject to any disclaimer, the term of this patent is extended or adjusted under 35 U.S.C. 154(b) by 30 days.

(21) Appl. No.: 15/276,114

(22) Filed: Sep. 26, 2016

(65) Prior Publication Data

US 2018/0086285 A1    Mar. 29, 2018

(51) Int. Cl.
*B62D 33/08* (2006.01)
*B60R 11/06* (2006.01)
*B60R 7/00* (2006.01)
*B60R 11/00* (2006.01)

(52) U.S. Cl.
CPC ............... *B60R 11/06* (2013.01); *B60R 7/00* (2013.01); *B60R 2011/0029* (2013.01)

(58) Field of Classification Search
CPC .... B60R 11/06; B60R 7/00; B60R 2011/0029
See application file for complete search history.

(56) References Cited

U.S. PATENT DOCUMENTS

| | | | |
|---|---|---|---|
| 7,059,646 B1 | 6/2006 | DeLong et al. | |
| 8,540,299 B2 | 9/2013 | Quiros Perez et al. | |
| 2008/0284192 A1* | 11/2008 | Lim | B60R 7/02 296/37.5 |

FOREIGN PATENT DOCUMENTS

| | | |
|---|---|---|
| DE | 10260032 A1 | 7/2004 |
| DE | 102004024609 A1 | 12/2005 |
| EP | 1852308 A1 | 11/2007 |
| JP | 2002046540 A | 2/2002 |

OTHER PUBLICATIONS

English Machine Translation of DE102004024609A1.
English Machine Translation of DE10260032A1.
English Machine Translation of EP1852308A1.
English Machine Translation of JP2002046540A.

* cited by examiner

*Primary Examiner* — Lori L Lyjak
(74) *Attorney, Agent, or Firm* — Vichit Chea; King & Schickli PLLC

(57) ABSTRACT

A telescopic load floor for a vehicle cargo area includes at least one load floor panel defined by a plurality of nesting members. A guide rail element guides translation of the plurality of nesting members between an open and a closed configuration. The telescopic load floor may define an arcuate bottom surface when extended.

17 Claims, 3 Drawing Sheets

TELESCOPIC LOAD FLOOR STRUCTURE

TECHNICAL FIELD

This disclosure relates generally to vehicle cargo areas. More particularly, the disclosure relates to a telescopic load floor structure for a vehicle cargo area.

BACKGROUND

For vehicles having a cargo area, it is common to provide a false floor or load floor structure to hide additional useful items stored within the cargo area. For example, for passenger vehicles such as sedans, sport- or crossover-utility vehicles, and the like having rearward cargo areas, often a load floor structure is provided to overlay a storage area disposed beneath the vehicle cargo area, wherein are stored useful items such as a spare tire, tire tools, a jack, etc. The conventional load floor structure comprises a planar, substantially inflexible panel which must be removed from the vehicle in order to access the items stored beneath. This can be inconvenient for the user, such as when the spare tire and tools must be accessed in a heavily trafficked area.

Accordingly, a need in the art is identified for alternative cargo area load floor structures. To address this need in the art, the present disclosure relates to a telescopic load floor structure which advantageously may simply be laterally displaced by a user in order to access items stored beneath, without requiring removal from the vehicle cargo area. The described telescopic load floor is light, durable, and provides significant ease of use.

SUMMARY

In accordance with the purposes and benefits described herein, in one aspect a telescopic load floor structure for a vehicle cargo area is described, comprising at least one load floor panel defined by a plurality of nesting members. In embodiments, the telescopic load floor comprises a pair of opposed sliding load floor panels each defined by a plurality of nesting members. A guide rail element may be provided for guiding translation of the telescopic load floor between an open and a closed configuration. At least a portion of each nesting member of the plurality of nesting members is configured and dimensioned to nest within an adjacent nesting member.

In embodiments, the telescopic load floor structure when fully extended provides a telescopic load floor having a planar top surface and an arcuate bottom surface. In embodiments, each nesting member of the plurality of nesting members is a sliding bar including a body aligned along a first plane and a pair of opposed end pieces aligned along a second plane that is perpendicular to the first plane.

In the following description, there are shown and described embodiments of the disclosed telescopic load floor structure. As it should be realized, the device is capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed telescopic load floor structure, and together with the description serve to explain certain principles thereof. In the drawing.

Reference will now be made in detail to embodiments of the disclosed telescopic load floor structure, examples of which are illustrated in the accompanying drawing figures.

DETAILED DESCRIPTION

Figure 1:
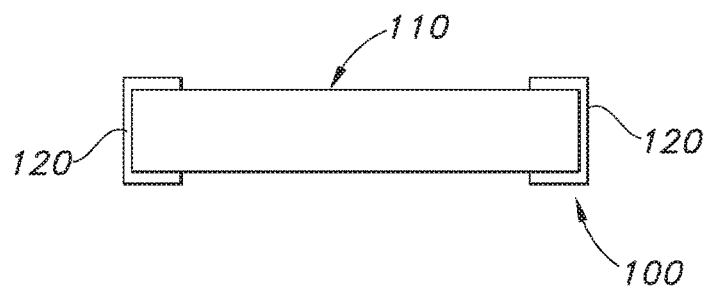
FIG. 1 shows an end view of a telescopic load floor assembly according to the present disclosure.
Figure 2:
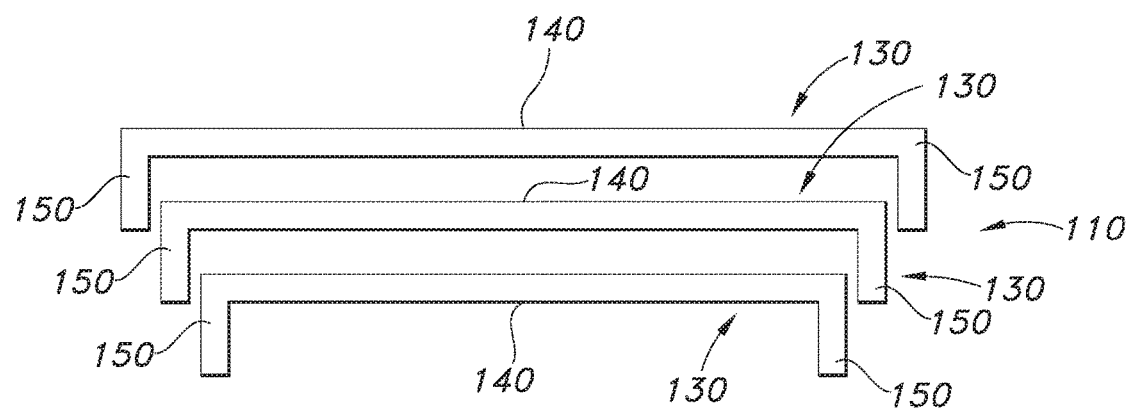
FIG. 2 shows a side exploded view of nesting members for use in the telescopic load floor assembly of FIG. 1.

With reference to FIG. 1, a telescopic load floor assembly 100 is depicted, including a telescopic load floor structure 110 and opposed guide rails 120. In an embodiment, the load floor structure 110 is defined by a plurality of nesting members 130 (see FIG. 2), each defined by a body 140 oriented on a first plane and a pair of opposed end pieces 150 oriented on a second plane that is substantially perpendicular to the first plane, thus defining a substantially C-shaped sliding bar. As shown in the drawing, each nesting member 130 is configured and dimensioned to nest within an adjacent nesting member 130.

Figure 3:
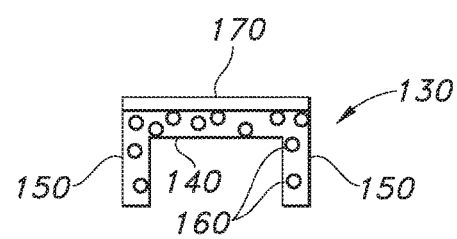
FIG. 3 shows an isolated side view of a nesting member for use in the telescopic load floor assembly of FIG. 1.

Any suitable material is contemplated for use in fabricating the nesting members 130, including without intending any limitation plastics, metals, polymers, carbon fiber, fiberglass, KEVLAR, and others. In one exemplary embodiment as shown in FIG. 3, the body 140 and opposed end pieces 150 may be fabricated of a suitable plastic matrix having glass fibers 160 dispersed therein for strength. Still further, a covering material 170 may be disposed on a top surface of the body 140. In embodiments, the covering material 170 is selected to match a material used to line/cover a vehicle cargo area (not shown in this view), thus presenting a uniform and aesthetically pleasing appearance.

Figure 4A:
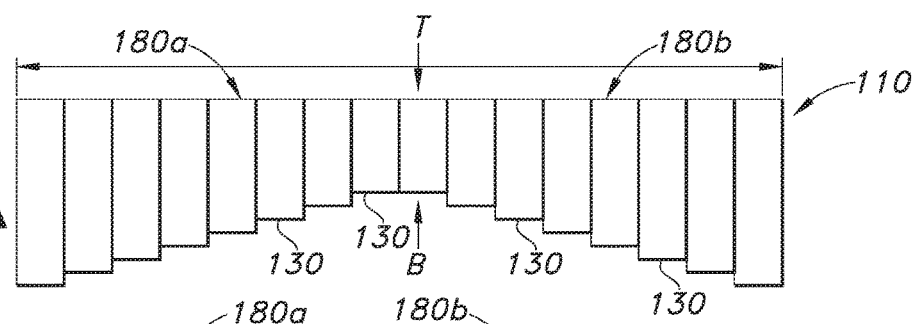
FIG. 4A shows a front view of an embodiment the telescopic load floor assembly of FIG. 1 in a fully extended configuration.
Figure 4B:
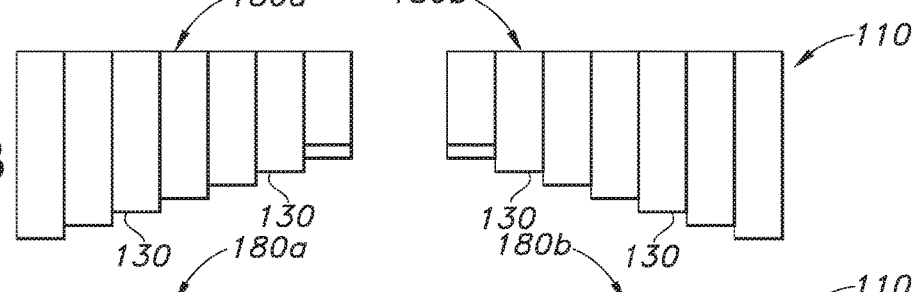
FIG. 4B shows a front view of the telescopic load floor assembly of FIG. 4A as the nesting members begin to retract.
Figure 4C:
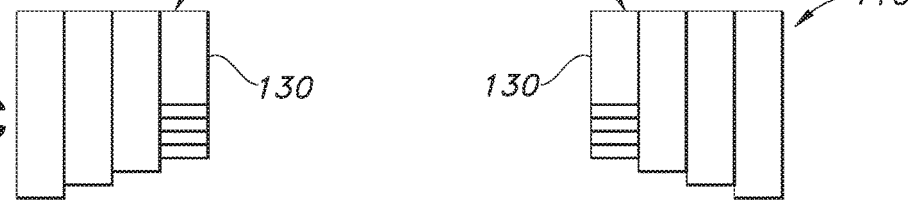
FIG. 4C shows a front view of the telescopic load floor assembly of FIG. 4A in a partially retracted configuration.
Figure 4D:
FIG. 4D shows a front view of the telescopic load floor assembly of FIG. 4A in a fully retracted configuration.

In one embodiment (see FIGS. 4A-4D), the telescopic load floor structure 110 is defined by a pair of opposed sliding load floor panels 180a, 180b, each of which is in turn defined by a plurality of nesting members 130 configured and dimensioned to nest within an adjacent nesting member as described above. FIG. 4A shows the pair of opposed sliding load floor panels 180a, 180b in a fully extended configuration to define the telescopic load floor structure 110, and FIG. 4D shows the pair of opposed sliding load floor panels in a fully retracted configuration. FIGS. 4B and 4C show the pair of opposed sliding load floor panels 180a, 180b in intermediately retracting configurations.

As shown in the drawing figures, when the pair of opposed sliding load floor panels 180a, 180b are in the fully extended configuration of FIG. 4A, a telescopic load floor structure 110 is defined having a substantially planar top surface T and an arcuate bottom surface B. As will be appreciated, this provides an arch structure to improve a load-bearing capacity of the telescopic load floor structure 110 while reducing a weight of the structure. As shown in the drawings, as the pair of opposed sliding load floor panels 180a, 180b are each retracted through the configurations shown in FIGS. 4B and 4C, each nesting member 130 retracts into and nests with an adjacent nesting member 130 until the fully retracted configuration of FIG. 4D is achieved. The items (not shown) stored below the telescopic load floor structure 110 can then be conveniently accessed by a user.

Figure 5:
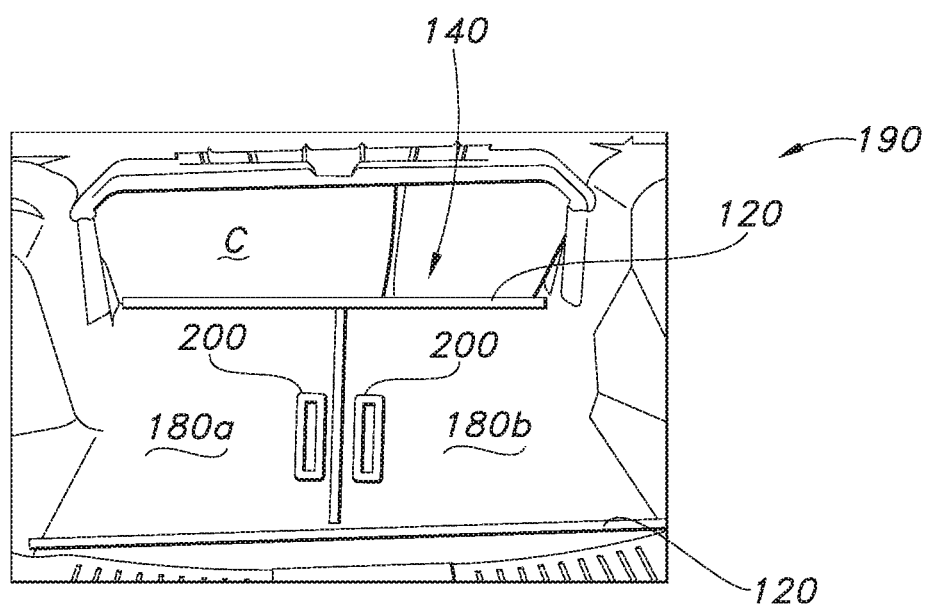
FIG. 5 shows the telescopic load floor assembly of FIG. 1 disposed in a vehicle cargo area.

In use in a vehicle 190 cargo area C (See FIG. 5) guide rails 120 may be disposed at opposed edges of the cargo area floor, for example at fore and aft edges as shown in the drawing, or alternatively along the side edges of the cargo area floor (embodiment not shown). The pair of opposed sliding load floor panels 180a, 180b are arranged such that they slide as a unit within the guide rails 120. When fully extended as shown in FIGS. 4A and 5, the pair of opposed sliding load floor panels 180a, 180b provide a telescopic load floor 110 for the cargo area C, hiding any items such as spare tires, tire tools, etc. below the telescopic load floor and allowing additional items to be conveniently placed in the cargo area C.

Handles 200 may be provided to improve ease of user operation of the opposed sliding load floor panels 180a, 180b. Of course, alternative embodiments are contemplated. For example, operation of the opposed sliding load floor panels 180a, 180b could be motorized, for example by use of a suitable motor operatively connected to a cable or belt arrangement, a suitable motor operatively connected to a stepper motor having a lead screw, and the like. In turn, nesting members 130 may simply slide within guide rails 120 as described, or may be further provided with bearings, wheels, or the like to reduce frictional contact. All such embodiments are contemplated for use herein.

Obvious modifications and variations are possible in light of the above teachings. All such modifications and variations are within the scope of the appended claims when interpreted in accordance with the breadth to which they are fairly, legally and equitably entitled.

What is claimed:

1. A telescopic load floor structure for a vehicle cargo area, comprising:
   at least one load floor panel defined by a plurality of nesting members; and
   a guide rail element;
   wherein the plurality of nesting members when translated to an extended configuration define a telescopic load floor having a planar top surface and an arcuate bottom surface.

2. The telescopic load floor structure of claim 1, comprising a pair of opposed sliding load floor panels each defined by a plurality of nesting members.

3. The telescopic load floor structure of claim 1, wherein at least a portion of each nesting member of the plurality of nesting members is configured and dimensioned to nest within an adjacent nesting member.

4. A vehicle including the telescopic load floor structure of claim 1.

5. A telescopic load floor structure for a vehicle cargo area, comprising a pair of opposed sliding load floor panels each defined by a plurality of nesting members;
   wherein the pair of opposed sliding load floor panels when translated to an extended configuration define a telescopic load floor having a planar top surface and an arcuate bottom surface.

6. The telescopic load floor structure of claim 5, further including a guide rail element.

7. The telescopic load floor structure of claim 5, wherein at least a portion of each nesting member of the plurality of nesting members is configured and dimensioned to nest within an adjacent nesting member.

8. A vehicle including the telescopic load floor structure of claim 5.

9. A telescopic load floor assembly for a vehicle cargo area, comprising:
   at least one load floor panel defined by a plurality of nesting members; and
   a guide rail element.

10. The telescopic load floor assembly of claim 9, comprising a pair of opposed sliding load floor panels each defined by a plurality of nesting members.

11. The telescopic load floor assembly of claim 9, wherein each nesting member of the plurality of nesting members is a sliding bar including a body aligned along a first plane and a pair of opposed end pieces aligned along a second plane that is perpendicular to the first plane.

12. The telescopic load floor assembly of claim 10, wherein each nesting member of the plurality of nesting members is a sliding bar including a body aligned along a first plane and a pair of opposed end pieces aligned along a second plane that is perpendicular to the first plane.

13. The telescopic load floor assembly of claim 11, wherein at least a portion of each sliding bar is configured and dimensioned to nest within an adjacent sliding bar.

14. The telescopic load floor assembly of claim 12, wherein at least a portion of each sliding bar is configured and dimensioned to nest within an adjacent sliding bar.

15. The telescopic load floor assembly of claim 9, wherein the plurality of nesting members when translated to an extended configuration define a telescopic load floor having a planar top surface and an arcuate bottom surface.

16. The telescopic load floor assembly of claim 10, wherein the pair of opposed sliding load floor panels when translated to an extended configuration define a telescopic load floor having a planar top surface and an arcuate bottom surface.

17. A vehicle including the telescopic load floor assembly of claim 9.

* * * * *